(12) United States Patent
James

(10) Patent No.: US 6,678,229 B1
(45) Date of Patent: Jan. 13, 2004

(54) METHODS FOR OPTIMIZING RECORDING ORDER OF DATA FILES TO OPTICAL MEDIA

(75) Inventor: Kenneth R. James, Pleasanton, CA (US)

(73) Assignee: Roxio, Inc., Santa Clara, CA (US)

( * ) Notice: Subject to any disclaimer, the term of this patent is extended or adjusted under 35 U.S.C. 154(b) by 226 days.

(21) Appl. No.: 09/962,911

(22) Filed: Sep. 24, 2001

(51) Int. Cl.[7] .................................................. G11B 7/00

(52) U.S. Cl. ............................ 369/53.11; 369/47.28; 369/47.36

(58) Field of Search ........................... 369/47.1, 47.15, 369/47.28, 47.29, 47.3, 47.32, 47.33, 47.36, 47.41, 47.53, 53.1, 53.11, 59.1

(56) References Cited

U.S. PATENT DOCUMENTS 5,953,300 A * 9/1999 Serizawa et al. ........ 369/53.41

* cited by examiner

Primary Examiner—Muhammad Edun
(74) Attorney, Agent, or Firm—Martine & Penilla, LLP

(57) ABSTRACT

Methods for maximizing recording efficiency when recording data from a source to an optical media are provided. In one example, a method includes identifying a list of files to be recorded, and then generating a plurality of recording orders for the list of files. A plurality of writing speeds supported by a target optical media recording device are determined, and then each of the plurality of recording orders for the list of files at each of the plurality of writing speeds are evaluated to determine the amount of system cache required and the projected recording time for recording the data. The method selects a single recording order and a single writing speed that minimizes system cache utilization and minimizes actual recording time to record the data from the source to the optical media.

20 Claims, 6 Drawing Sheets

| Write Speed | List I | List II | List III | List IV | List V | ... |
|---|---|---|---|---|---|---|
| 20X | 120 | 152 | 145 | 153 | 132 | ... |
| 16X | 135 | 147 | 110 | 180 | 182 | ... |
| 12X | 120 | 115 | 127 | 131 | 130 | ... |
| 10X | 112 | 111 | $100_{s_1}$ | 105 | 118 | ... |
| 8X | 105 | 109 | 114 | 113 | 107 | ... |
| ... | ... | ... | ... | ... | ... | ... |
| 1X | $100_{s_2}$ | 106 | 114 | 116 | 118 | ... |

FIG. 5

METHODS FOR OPTIMIZING RECORDING ORDER OF DATA FILES TO OPTICAL MEDIA

BACKGROUND OF THE INVENTION

1. Field of the Invention

The present invention relates generally to the recording of data onto optical media, and more particularly to a method for optimizing the order in which files are recorded to optical media to minimize cache utilization and maximize recording efficiency.

2. Description of the Related Art

When recording data to optical media, a user typically selects a plurality of files from a source or plurality of sources, identifies a target destination, and executes a recording function. The selected files can be of any type including audio files, video files, photographic files, data files, and the like. The recording function is typically executed by use of an optical media recording program which accomplishes such tasks as mapping out precise locations of source files, determining size of source files, mapping out a precise target destination for the selected files, calculating a theoretical transfer rate for reading the file from a source and recording the file to a destination, identifying those files that will be cached and those files that will be recorded directly from source to destination, performing necessary formatting as required, and burning the selected files to a destination optical media.

A typical prior art process flow diagram 10 is illustrated in FIG. 1. The illustrated process flow is for the recording of data files to a destination optical media. The process begins after the files have been selected for burning to optical media. The method operations represent the general, and not the specific, tasks that are accomplished in the preparation and burning of data files to optical media.

In operation 12, an enumeration of the selected files is provided. The enumeration is typically a list of the selected files to be burned to optical media, their source locations, and file sizes.

After an enumeration of the selected files has been provided (signifying that files have been selected for burning to optical media), the method advances to operation 14 in which a system test is performed. The system test is performed to calculate an average file transfer rate. The system test includes evaluating files within a range. The evaluated range is subdivided into small files that are, for example, 0 and 300 KB in size, and large files that may be 1–10 Mbytes in size. The source drive is searched for a volume of files of both small and large size and then the system test calculates an average file transfer rate based on the files evaluated. The files evaluated are not necessarily those that have been selected for burning to an optical disc. The system test is performed one time, whether or not files are deleted from those selected for transfer, or additional files selected for transfer.

Following the system test, the method advances to operation 16 in which a caching algorithm is performed. In prior art optical media recording operations, a caching algorithm is usually a single-pass evaluation of each file in the enumeration of files to be burned to optical media obtained in operation 12. A simulated burn is performed in which no hardware is engaged, but each file is evaluated for a recording process. The caching algorithm performs a sequential evaluation of the selected files in the order of the enumeration of files. A theoretical transfer rate is calculated for each file based on the source location of the file, and the size of the file. The theoretical transfer rate of each file is used with the system transfer capability calculated in operation 14 to identify those files that will be cached during the actual recording operation.

FIG. 2A is a theoretical transfer rate table 100 listing the theoretical transfer rates of exemplary files selected to be recorded to optical media. File column 102 lists each of the files in the enumeration of files, and in the order in which the files are listed in the enumeration of files. Each file has a corresponding theoretical transfer rate noted in the transfer rate column 104. The theoretical transfer rate table 100 lists each file that has been selected for recording to optical media, and the theoretical transfer rate of each file based on the source location and file size, and using the system transfer capability as calculated in the system test of operation 14 of the flow chart 10 illustrated in FIG. 1.

As is known, when files are recorded to optical media, the files are read from a source location or a system cache into a buffer of a recording device. The files are then written to the destination or target optical media from the optical media recording device buffer, along with required file system and other data structures in order to comply with accepted data formats and specifications. The operation of burning files to optical media includes the simultaneous operations of reading data into the optical media device buffer and writing data to a destination optical media. In order to maintain a constant and error-free recording operation, the supply of data to the buffer and the depletion of data from the buffer must remain fairly constant with little tolerance for fluctuation between the filling and the depletion of the buffer. If the data files from the buffer are written to the target optical media faster than the reading of data into the buffer, then the buffer will empty resulting in buffer underrun and recording errors or the halting of the recording operation. As stated above, the enumeration of files is read and evaluated sequentially. The status of the capacity of the buffer, and the size and transfer rate of the data is evaluated for each of the data files in the sequential listing of the enumeration of files.

FIG. 2B is a block diagram of a buffer 110. Data is read into the buffer 110, and then written to the target media. The amount of data in the buffer fluctuates as data is read into the buffer at a system transfer rate (actual), and data is simultaneously written to the target optical media at a write speed, thereby depleting data from the buffer. Typically, the prior art caching algorithm sequentially reads and evaluates the files in the enumeration of files and selects files to be recorded from the source location and files to be sent to system cache based on maintaining a predetermined percentage of capacity in the buffer. By way of example, if the predetermined percentage of capacity is 20% 112, then files are sent to cache or read directly from a source location based on maintaining at least 20% 112 of maximum buffer capacity 114 in the buffer. Therefore, if an exemplary file is next in sequence in the enumeration, the exemplary file has a transfer rate that is slower than the burn rate, or write speed, and the percentage of capacity of the buffer would fall below 20% 112 during the transfer of the file, the file would most probably be cached.

Returning to the flow chart diagram 10, the method advances to operation 18 in which the identified files are cached. In the prior art algorithm, files are generally identified to be cached if the calculated transfer rate of the file is less than the burn rate and the buffer will empty below a predetermined percentage of capacity. By way of example, if a file is evaluated to have a transfer rate that is slower than the burn rate, and the buffer is projected to be at a low percentage of capacity when the file is to be transferred, then the file would probably be identified to be cached. If, however, the file has a transfer rate that is slower than the burn rate, but the buffer is projected to be at a high percentage of capacity such that it does not empty below a predetermined percentage of capacity during the transfer of the file, then the file would probably not be identified to be cached. As is known, the caching of files ensures a generally constant flow of data at a high speed to the buffer. Caching, however, adds additional time to the recording process by first reading the identified files at about the theoretical transfer rate into system cache, and then reading the files from the system cache into the buffer at a designated time.

Those files that have been identified to be cached as a result of the caching algorithm performed in operation 16, are sent to cache in operation 18. Following the caching of identified files, the method proceeds to burn the optical media in operation 20 and the method is done.

The prior art method of identifying and caching files for transfer does not provide the most efficient method of recording files to optical media, and can place significant burdens on system efficiency by consuming a maximum amount of system resource in the resulting caching operations. By sequentially evaluating the selected files in a single pass through the enumeration of files, one of two results is possible. Either the caching algorithm identifies those files that will be sent to cache and those files that can be read directly from a source location, or the caching algorithm returns an error informing the operator that not enough system cache is available to perform the recording operation. The latter possible result is more likely when a plurality of small files have been selected for recording, resulting in increased seek times and decreased transfer speeds. Further, the process of caching data adds time to the recording process. If a large amount of data is identified to be cached, the resulting recording time to burn even one optical media can be unreasonably long.

In view of the foregoing, there is a need for a more intelligent method of evaluating files selected for recording to optical media that will minimize cache size and maximize recording efficiency. The method should be configured to evaluate the plurality of files selected for recording for the most efficient combination of files and order of burning to optical media. The method should be further configured so that recording time is not unreasonably increased.

SUMMARY OF THE INVENTION

Broadly speaking, the present invention fills these needs by providing a method for optimizing the order in which data files are recorded to optical media. The present invention can be implemented in numerous ways, including as a process, an apparatus, a system, a device, a method, or a computer readable media. Several embodiments of the present invention are described below.

In one embodiment, a method for maximizing the recording efficiency for recording data from a source to an optical media is disclosed. The method includes identifying a list of files to be recorded, and then generating a plurality of recording orders or sequences for the list. The method further determines a plurality of writing speeds for an optical media recording device, and then evaluates the amount of system cache needed and the projected recording time for each of the plurality of recording orders or sequences for the list of files at each of the plurality of writing speeds. The method then selects a single recording order and a single writing speed that minimizes system cache utilization and minimizes actual recording time from the source to the optical media.

In another embodiment, a computer method for recording data from a source to an optical disc is disclosed. The method includes obtaining a list of files to be recorded. The method refers to a plurality of recording orders for the list of files to be recorded, and obtains a plurality of writing speeds of an optical recording device. The method provides that for each of the plurality of recording orders, a projected recording time at each of the plurality of writing speeds is evaluated. The method then selects a single recording order and a single write speed that minimizes actual recording time to record the data.

In still a further embodiment, a method for optimizing the recording order of data files selected to be recorded to optical media is disclosed. The method includes obtaining a first sequence of data files selected to be recorded to the optical media, and setting a first write speed for recording to the optical media. The method then provides for evaluating the first sequence of data files at the first write speed. Next, the method sets a second write speed for recording to the optical media, and evaluates the first sequence of data files at the second write speed. The method then obtains a second sequence of data files and repeat the setting and evaluating, using the obtained second sequence in place of the obtained first sequence. The method then selects one of the first or second sequences of data files for recording at one of the first or second write speeds. The selected sequence and write speed is configured to match a sequence of data files with a write speed so as to minimize cache utilization and recording time.

The advantages of the present invention are numerous. One notable benefit and advantage of the invention is that recording speed and efficiency are greatly improved making the recording of data files to optical media an easier and more accessible task for the average consumer. By increasing the recording efficiency, more system resources are available for normal system processing, thereby reducing the risk of system crash or recording error. More noticeable to the average user, the more efficient the recording process is, the faster the process becomes. Speed and efficiency combine to make the recording process a simple task that presents fewer barriers or obstacles, and thus becomes more accessible to the average user.

Another benefit of note is that the method of the present invention reduces the likelihood of returned errors indicating selected files cannot be recorded due to a lack of available resources. By evaluating a plurality of file sequences and combinations, the present invention provides a method more likely to identify a recording sequence of files that can be accomplished with available system cache, and in the most efficient manner at the fastest recording and through-put speeds.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

FIG. 5 shows a matrix of scores assigned to lists of data files at a plurality of write speeds in accordance with one embodiment of the invention.

DETAILED DESCRIPTION OF THE PREFERRED EMBODIMENTS

A method for determining an optimum sequence of files to be written to destination media is disclosed. In preferred embodiments, the method evaluates a plurality of sequences or orders of data files at a plurality of supported write speeds for a target optical media recording device in order to identify the most efficient recording order of data files selected for recording to optical media with the fastest recording time. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figures 3A, 3B:
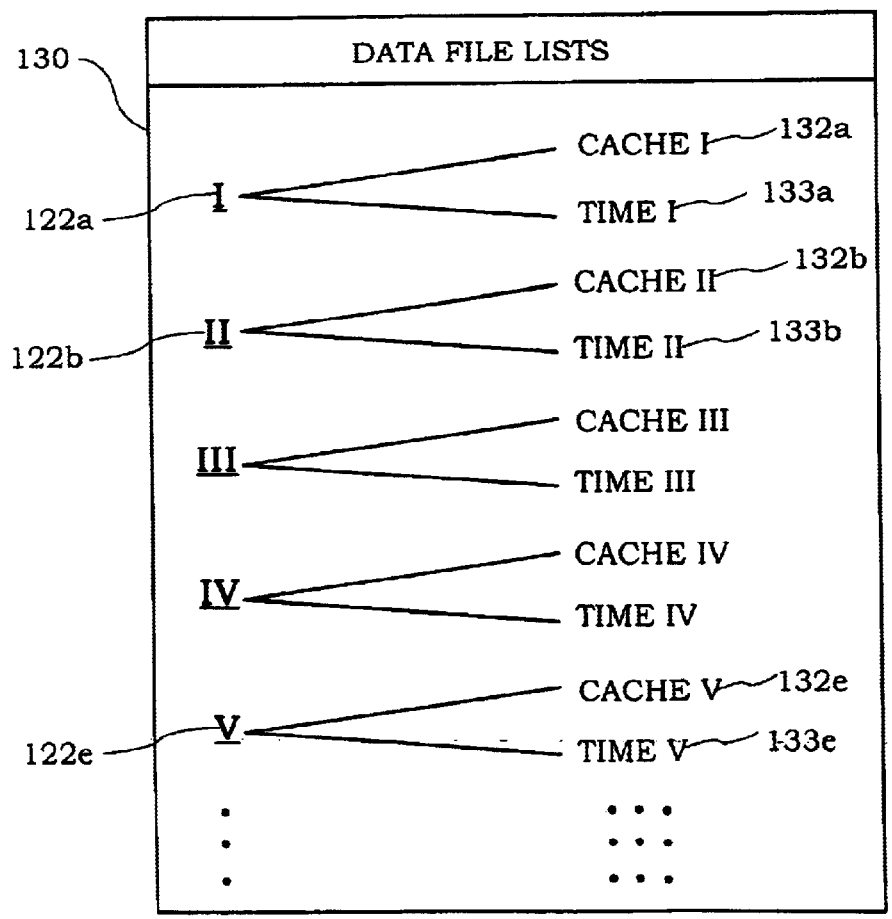
FIG. 3A is an exemplary table of a plurality of lists of data files selected for recording to optical media in accordance with one embodiment of the present invention.
FIG. 3B shows a table of values associated with each data file list to be evaluated in accordance with an embodiment of the invention.

As described above, the prior art caching algorithm utilizes a single pass evaluation of the files selected to be recorded to optical media in the order of the enumeration of files. It should be recognized that a plurality of sequences and combinations of files are possible for each selection of a plurality of files to be recorded. In one embodiment of the present invention, the enumeration of files includes a plurality of lists or sequences of files for evaluation. FIG. 3A is an exemplary table 120 of a plurality of lists of data files selected for recording to optical media in accordance with one embodiment of the present invention. Exemplary data files A through E are shown listed in a plurality of sequences in data file lists I 122a, II 122b, V 122e, and so forth until all possible sequences of files are enumerated. The table 120 shown in FIG. 3A is used to show the plurality of combinations and sequences that might result from a few representative files. In operation, the present invention processes a single enumeration of all selected files, which is then provided for evaluation in a plurality of lists of sequences of all selected files.

Figure 1:
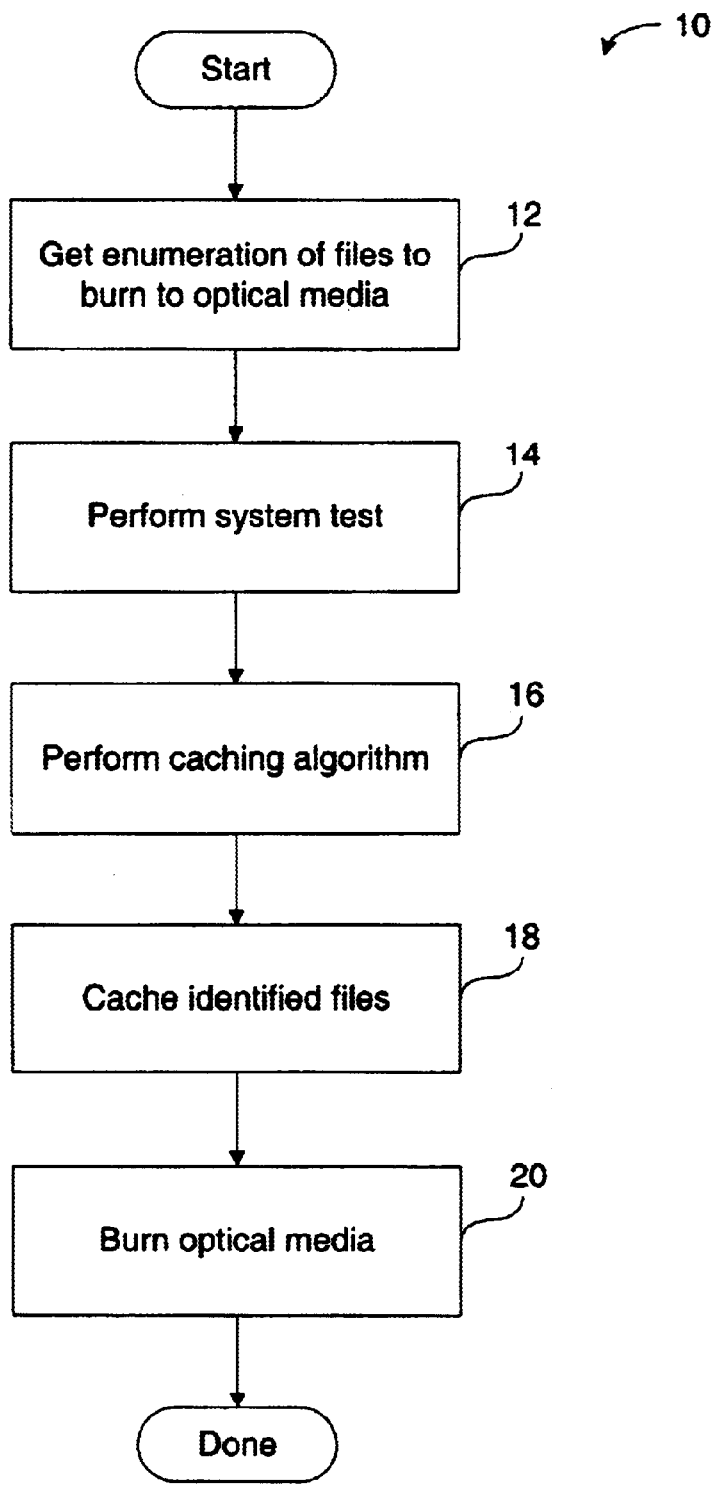
FIG. 1 illustrates a flow diagram of a prior art process flow for recording data files to a destination optical media.

In one embodiment of the present invention, the lists of data files are then evaluated in accordance with the system test and the caching algorithm described in reference to FIG. 1. Because each of the data files can be of a different size and in a different source location, the sequence in which the data files are evaluated can significantly vary the volume of data in the buffer at any one time, and the amount of data identified to be cached. FIG. 3B shows a table of values 130 associated with each data file list to be evaluated in accordance with an embodiment of the invention. Lists I 122a, II 122b, V 122e, and so forth are each processed through a caching algorithm yielding a cache value and a theoretical recording time for each list. In the exemplary table 130, list I 122a yields a cache I 132a amount of data to be cached according to the sequence of data files in list I 122a, and a theoretical recording time I 133a for list I 122a. Similarly, list II 122b is processed yielding cache II 132b and time II 133b, list V 122e yields cache V 132e and time V 133e, and so forth until each of the data file lists are processed through the caching algorithm.

In this embodiment of the invention, the plurality of data file sequences is evaluated according to the system test parameters and the above described caching algorithm. The probability of a returned error indicating the selected files cannot be recorded due to insufficient system cache is reduced, and a more efficient recording process can be accomplished by selecting the sequence that balances cache utilization and recording time. The recording speed, however, remains another recording process parameter that can be evaluated and manipulated in order to optimize the recording process.

Figure 4:
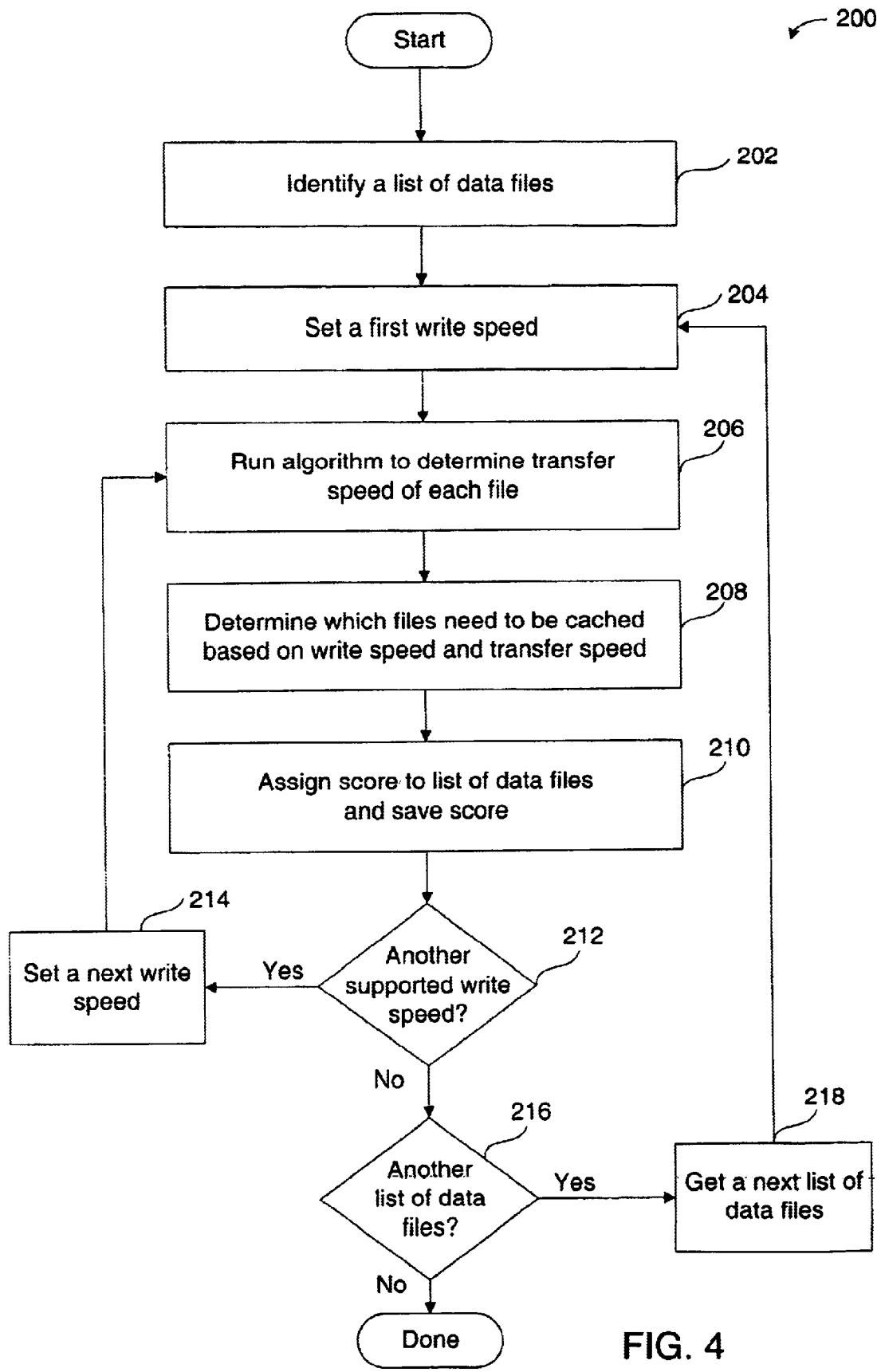
FIG. 4 is a flow chart diagram illustrating the method operations performed in optimizing the recording order of data files to optical media in accordance with one embodiment of the present invention.

In a preferred embodiment of the present invention, the evaluation of the plurality of data file lists is expanded to include the evaluation of each data file list at all available recording speeds of the target optical media recording device. FIG. 4 is a flow chart diagram 200 illustrating the method operations performed in optimizing the recording order of data files to optical media in accordance with one embodiment of the present invention. The method begins with operation 202 in which a first list of data files is identified. As described above in reference to FIG. 3A, the enumeration of files is a listing of all of the data files selected for recording to optical media, including the source path for each file, and the file size. In an embodiment of the present invention, the enumeration of files is configured to provide a plurality of lists of the data files in a plurality of sequences and file combinations. In one embodiment, each list contains all of the selected files for recording in a unique sequence. In operation 202, one of the plurality of lists of data files is identified. This first list will then be evaluated according to the method to follow.

The method continues with operation 204 in which a first write speed is set. In one embodiment of the invention, the first write speed is the fastest write speed supported by the target optical media recording device. Typically, a target optical media recording device supports a plurality of write speeds to provide for a balancing of file transfer speeds of the source files with the write speeds from the device buffer to the target optical media. The balancing of the transfer and write speeds is generally intended to prevent or avoid buffer underrun. The number and range of supported write speeds is dependant upon the particular target optical media recording device in use. In operation 204, the first of the plurality of supported write speeds is set for the purpose of the calculations to follow.

The method advances to operation 206 and the calculation of the transfer speed for each file. As described above in reference to FIG. 1, the transfer speed of each file is determined primarily by the size of the file, and the source location of the file. In operation 206, each file is analyzed and a transfer speed is assigned to each file.

The method continues with operation 208 in which it is determined which files need to be cached and which files can be read directly from a source. The caching algorithm uses the write speed set in operation 204 and the transfer speed calculated in operation 206 for the list of files as identified in operation 202. As described above in reference to FIG. 1, a caching algorithm evaluates the files and selects files for writing from the source, and files for sending to system cache in order to maintain a predetermined minimum percentage of capacity in the buffer. In one embodiment, the percentage of capacity is 20%, and files are either read directly from a source into the buffer, or sent to a system cache from which they will be read into the buffer, so that the buffer never falls below 20% at any time during the recording process. In other embodiments, the percentage of capacity is more or less than 20%, and is determined based on buffer size, system speed and capacity, and other such variables. The 20% percentage of capacity used in one embodiment is exemplary only as actual system speed, capacity, and other variables will determine an optimum percentage of capacity to be maintained in other embodiments.

Once the caching algorithm is complete and it is determined which files will be cached and which files will be read directly from a source into the device buffer, the method proceeds with operation 210 in which a score is assigned to the just evaluated list of data files and saved. The score will be used to determine the most efficient sequence of data files for recording to a target optical media The score is determined and assigned based on the volume of data that will be sent to system cache, as well as the total transfer time that will be required to record all of the selected data files to the destination optical media. As described in reference to FIG. 3B, the caching algorithm yields a total volume of data that will be cached, and a projected length of time for recording the selected data files. In operation 210, a score is assigned to the list that was identified in operation 202. The assignment of a score, and the use of a score in the present invention is described in greater detail below in reference to FIG. 5.

Figure 2A:
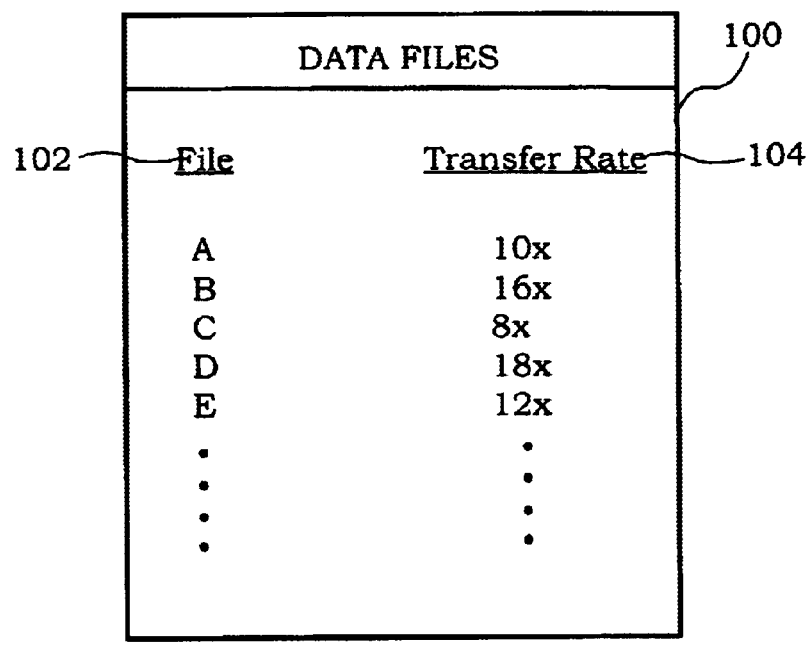
FIG. 2A is a theoretical transfer rate table listing the theoretical transfer rates of exemplary files selected to be recorded to optical media.
Figure 2B:
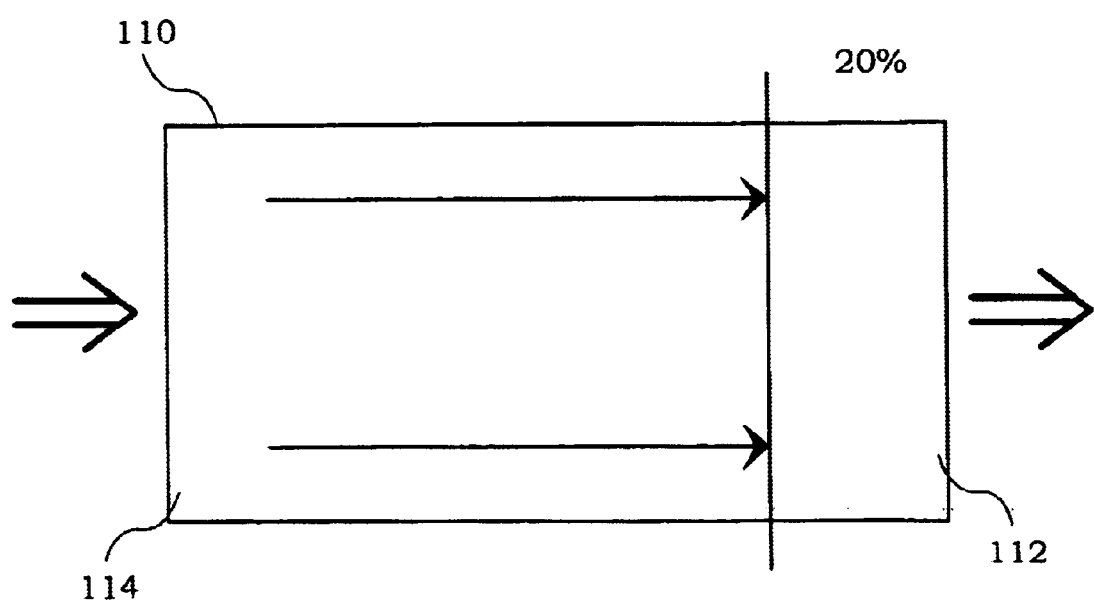
FIG. 2B is a block diagram of a buffer.

After the method assigns and saves a score for the list in operation 210, the method continues with decision block 212 in which a first loop is established in order to evaluate each list at every supported write speed. As described above in reference to FIG. 2B, the recording of data to optical media includes the reading of data into a device buffer, and the writing of data from the device buffer to the target media. The buffer must be maintained at a minimum percentage of capacity during the recording operation in order to avoid buffer underrun and the halting of the recording process. It is typically desired, therefore, that data be written from the buffer to the target media at a write speed that is equal to, or slightly slower than, the transfer rate, or the rate at which data is read into the buffer from either a source location or a system cache. In operation, some files are written faster than data is read into the buffer, and some files are written slower than data is read into the buffer, and the volume of the buffer fluctuates. As long as the buffer is maintained with at least 20%, or some other desired minimum percentage of capacity, the fluctuation is expected, and acceptable. If a system transfer speed is generally slower than the maximum write speed of a target device, then a slower write speed might be desirable in order to maintain the desired buffer volume, and reduce the amount of data sent to system cache.

In decision block 212, it is determined whether another write speed is supported by the target recording device. If another write speed is supported, the method proceeds to operation 214 in which the next write speed is set, and then loops back to operation 206 in which the transfer speed of each file is determined. From operation 206, the method proceeds through operations 208 and 210 and the caching algorithm at the new write speed. As described above, even though the same list is being evaluated, the resulting cache volume and time for recording may be different due to the different write speed, with resulting different processing times through the buffer.

The method returns to decision block 212 and runs the above described method operations for each supported write speed of the target recording device. After the final supported write speed is evaluated, the result at decision block 212 is "No," and the method advances to decision block 216.

Decision block 216 establishes the loop in the method to evaluate each of the plurality of data lists. At decision block 216, it is determined whether or not another list of data files exists. A next list of data files, for as long as another list of data files is provided, is a unique sequence of the files selected to be recorded to optical media. If there is another list of data files, a "Yes" to decision block 216, the method proceeds through operation 218 where the next list of data files is provided, to operation 204 in which a first write speed is set. The method then proceeds to evaluate the next list of data files as already described, making a determination of which files would need to be cached and the total recording time at each supported write speed, and assigning a score to the list of data files at each supported write speed. When all lists of data files have been evaluated, a "No" to decision block 216, the method is done.

The score described in reference to operation 210 of FIG. 4 is a rating of recording efficiency. Factors such as total recording time, the amount of data that will be sent to cache, the number of files to cache, and the like are used to rate each list at each write speed and assign a number to the list at a particular speed. The number is used as a comparison factor with all other numbers assigned to all of the lists at all of the recording speeds. As will be described in greater detail below, in one embodiment, the lowest score indicates the highest level of recording efficiency, and signifies the desired list at the identified write speed. The desired list, therefore, is the preferred order in which to record the selected data files to the destination optical media, and at the indicated write speed. The preferred order represents the sequence of the data files selected for recording to optical media that results in the most efficient recording process by minimizing both the amount of data sent to system cache as well as the time required to record the selected files.

FIG. 5 shows a matrix 230 of scores assigned to lists of data files at a plurality of write speeds in accordance with one embodiment of the invention. Exemplary lists of data files are identified across the matrix 232, and exemplary write speeds are identified down the matrix 234. As each list is evaluated at a specific write speed, a score is assigned and saved as described above in reference to operation 210 of FIG. 4. The matrix 230 shown in FIG. 5 provides a graphic illustration of the saving of the scores that will be evaluated to determine the preferred order at a particular write speed. It should be noted, the scores illustrated are intended to be representative of the manner and process of assigning and saving a score. Actual scores in implementation of the present invention may vary significantly from those shown in FIG. 5. Therefore, in one embodiment the most efficient recording of files is identified by the lowest score, and in another embodiment, the most efficient recording of files is identified by the highest score.

In one embodiment of the invention, the matrix 230 is filled with scores as lists are evaluated as described in reference to the flow chart diagram 200 in FIG. 4. When scores are saved in operation 210, the scores are recorded in a matrix 230 in the appropriate location. By way of example, if List II is evaluated at write speed 12X, the score assigned might be 115. After evaluating List II at 12X, and assigning and saving score 115, List II is next evaluated at 10X. As shown in FIG. 5, the score assigned to List II at 10X has been recorded to be 111. As shown in FIG. 5, the matrix 230 is completed in one embodiment by evaluating each list beginning at a fastest write speed supported by the target recording device, and proceeding down the matrix 234 to record each score for each supported speed. When a last speed supported by a device is evaluated for a list (the last speed typically being 1X), the completion of the matrix 230 proceeds across the matrix 232 to the next list and begins evaluation once again with the fastest supported write speed.

Figure 6:
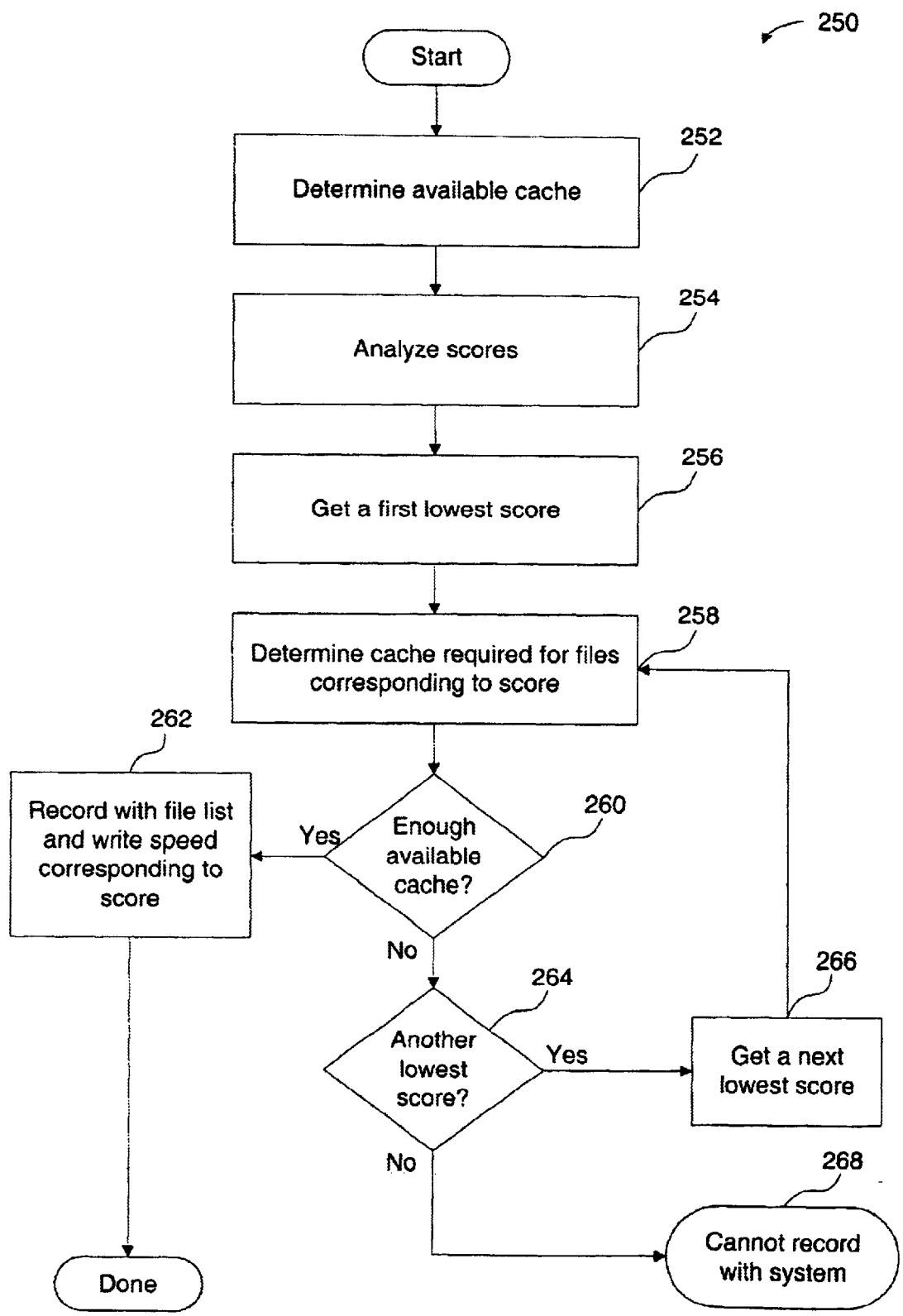
FIG. 6 is a flow chart diagram showing the method operations for selecting the optimum order for recording files to optical media in accordance with one embodiment of the present invention.

Once all of the lists of data files have been evaluated at all supported write speeds, the scores are examined to identify the optimum order for the selected files to be recorded to optical media. FIG. 6 is a flow chart diagram 250 showing the method operations for selecting the optimum order for recording files to optical media in accordance with one embodiment of the present invention.

The method begins with operation 252 in which the available system cache is determined. The method of assigning a score to each list at every supported write speed as described in reference to FIG. 4 is accomplished without regard to available system resources, and therefore the selection of an optimum order for the selected files to be recorded requires consideration of available resources. In operation 252 of FIG. 6, the currently available system cache resources are determined for use in making an appropriate list selection.

The method proceeds with operation 254 and the systematic analysis of the assigned and saved scores. In one embodiment, the analysis begins with the first score at the fastest supported write speed, and proceeds through all lists at the fastest write speed. Once all of the scores at the fastest write speed are analyzed, the analysis continues to the next supported write speed. In FIG. 5, the analysis would begin with the score corresponding to List I at 20X which is 120, and proceed across the matrix 232 to ListII at 20X, List III at 20X, and so forth until all scores in the matrix corresponding to the write speed of 20X are analyzed.

The analysis of the scores in operation 254 of FIG. 6 is, in one embodiment, simply noting all of the assigned scores. In order to determine the optimum recording order, all of the scores in the matrix must be noted before proceeding with the method operations.

Once all of the scores have been analyzed, the method continues with operation 256 in which the first lowest score is obtained. In one embodiment of the invention, the scores are assigned such that the lowest score corresponds to some combination of a fast recording speed and a minimum system cache utilization. It is possible, however, that a very fast recording speed might correspond to a large system cache utilization and still result in a low score. A score must be further examined to determine the feasibility of the particular combination of recording speed and required system cache resulting in the selected score.

Once the first lowest score is obtained, the method next determines the system cache required for the data files identified to be sent to system cache that correspond to the selected score in operation 258. As described above, each score corresponds to a specific list of data files at a particular write speed. For every sequence of data files at a particular write speed, the previously described algorithm identified those files that would be sent to system cache from where they would be read into the device buffer, and those files that would be read directly into the device buffer from a source location. In operation 258, an amount of system cache that would be required to record the data files in the order and at the write speed corresponding to the obtained first lowest score is determined.

The method then advances to decision block 260 in which the required system cache determined in operation 258 is compared to the available system cache determined in operation 252. In one embodiment of the invention, the probability of achieving a lowest score with an excessive cache requirement is low, but the method operations provide for the possibility. If the required cache for the sequence of data files at the particular write speed corresponding to the score being analyzed exceeds the available cache, a "No" to decision block 260, the method advances to decision block 264.

At decision block 264, the method determines if another lowest score exists. If the method proceeds to decision block 264 due to a deficit of available system cache for analyzed list and write speed combinations, the determination of another lowest score will always be yes unless and until each combination of list and device write speed is examined. If the previous score does not correspond to the last list and write speed combination, the answer to decision block 264 is "Yes" and the method proceeds through operation 266 where the next lowest score is obtained, and then loops back to operation 258 where the cache requirement for the list and write speed combination corresponding to the next score is determined. In this manner, each list and write speed is examined in the order of decreasing efficiency until a score corresponding to a list and write speed with a cache requirement that is less than the system cache availability is identified. If no such combination exists for the selected files to be recorded, the answer to decision block 264 becomes "No" after the last score is examined, and the method terminates at 268 unable to record the selected files.

In the implementation of one embodiment of the invention, the system cache availability is not typically a barrier to data recording. When a lowest score corresponds with a list and write speed combination with a cache requirement that is less than the system cache availability, the response to decision block 260 is "Yes" and the method proceeds to operation 262 in which the selected data files are recorded to a target optical media in the order of the corresponding list and at the corresponding write speed. With the recording of the selected files, the method is done. Although every list and write speed combination is evaluated and scored, the selection of an optimal recording order requires only the selection of the lowest score with a corresponding system cache requirement that is less than the available system cache. It is possible for such a score to be the first lowest score evaluated, just as it is possible for the score to be the last remaining score in the matrix to be evaluated. The first score that meets the criteria ends the method and results in the most efficient and optimal ordering of selected data files for recording to optical media.

It is further possible that more than one list and write speed combination will be assigned the same score. In the embodiment illustrated in FIG. 5, the score assigned to List III at a write speed of 10X is 100 shown at $S_1$. Additionally, the score assigned to List I at a write speed of 1X is also 100 shown at $S_2$. As described above, the first score that meets the criteria ends the method and results in the most efficient and optimal ordering of the selected data files for recording to optical media. Therefore, if $S_1$ is the first score (of the two identical scores) to be evaluated, and it meets the criteria, then $S_1$ is selected and ends the method. If $S_1$ is the first score to be evaluated and fails to meet the criteria, then the method continues and $S_2$ is next evaluated. It is possible that both $S_1$ and $S_2$ fail to satisfy the criteria, and the method would continue to evaluate the next lowest score. Which of $S_1$ and $S_2$ is first evaluated is dependent upon the desired method of evaluating the scores. As described above, in one embodiment, the evaluation of scores proceeds through all scores at a particular write speed from the fastest write speed through the slowest write speed. In this embodiment, $S_1$ is at 10X and would be evaluated before $S_2$ at 1X.

In one embodiment of the invention, the true recording or through-put time is used to score the data file list and write speed combinations. In this embodiment, the true recording speed is calculated based on the transfer speed, the amount of data sent to system cache and the selected write speed of the destination media recording device. By way of example, in FIG. 4, operation 210 would calculate the true recording or throughput time for the list and write speed combination, and save the true recording or throughput time. In FIG. 5, the matrix 230 might detail the plurality of calculated true recording or through-put times, and in FIG. 6, all operations utilizing information relating to scores could be modified to utilize the true recording or through-put times. Specifically, operation 256 would obtain the lowest, or fastest, true recording time, and the method would provide the optimal recording order of data files by starting the analysis with the lowest, or fastest, true recording or through-put time and selecting the first time that corresponds to a system cache requirement that is less than the currently available system cache.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for maximizing recording efficiency for recording data from a source to an optical media, comprising:

identifying a list of files to be recorded;

generating a plurality of recording orders for the list of files to be recorded;

determining a plurality of writing speeds of an optical media recording device;

evaluating an amount of system cache needed and a projected recording time for each of the plurality of orders for the list of files at each of the plurality of writing speeds; and selecting a single recording order and a single writing speed that minimizes system cache utilization and minimizes actual recording time from the source to the optical media contained in the optical media recording device.

2. A method for maximizing recording efficiency for recording data from a source to an optical media as recited in claim 1, further comprising:

assigning a score to each one of the plurality of recording orders for the list of files to be recorded at each of the plurality of writing speeds, wherein the selecting of the single recording order and the single writing speed that minimizes system cache utilization and actual recording time from the source to the optical media contained in the optical media recording device corresponds to a selecting of the score assigned to an optimum recording order at an optimum recording speed for the data.

3. A method for maximizing recording efficiency for recording data from a source to an optical media as recited in claim 2 wherein the selecting of the score assigned to an optimum recording order at an optimum recording speed for the data includes verification of sufficient system cache for the selected optimum recording order at the optimum recording speed.

4. A method for maximizing recording efficiency for recording data from a source to an optical media as recited in claim 1, wherein the evaluating the amount of system cache needed includes calculating a theoretical transfer rate for each file in the list of files to be recorded and determining for each file in the list of files to be recorded if the file will be transferred to system cache during the recording of the data.

5. A method for maximizing recording efficiency for recording data from a source to an optical media as recited in claim 4, wherein the determining for each file in the list of files to be recorded if the file will be transferred to system cache during the recording of the data includes maintaining a predetermined minimum percentage of capacity of data in a buffer of the optical media recording device.

6. A method for maximizing recording efficiency for recording data from a source to an optical media as recited in claim 1, wherein the evaluating o f the amount of system cache needed and a projected recording time for each of the plurality of orders for the list of files at each of the plurality of writing speeds is performed for each of the plurality of recording orders at the fastest writing speed supported by the optical media recording device first followed by evaluating each of the plurality of recording orders at each next writing speed supported by the optical media recording device, wherein each next writing speed is a successively next slower supported writing speed until the writing speed equals 1×.

7. A computer method for recording data from a source to an optical disc, the computer method comprising:

obtaining a list of files to be recorded;

referring to a plurality of recording orders for the list of files to be recorded;

obtaining a plurality of writing speeds of an optical recording device;

for each of the plurality of recording orders, evaluating a projected recording time at each of the plurality of writing speeds; and selecting a single recording order and a single write speed that minimizes actual recording time to record the data.

8. A computer method for recording data from a source to an optical disc as recited in claim 7, the computer method further comprising:

for each of the plurality of recording orders, evaluating a system cache required to record the data at each of the plurality of writing speeds; and selecting a single recording order and a single write speed that minimizes system cache utilization and actual recording time to record the data.

9. A computer method for recording data from a source to an optical disc as recited in claim 8, wherein the selecting of the single recording order and the single write speed includes assigning a score to each one of the plurality of recording orders for the list of files to be recorded at each of the plurality of writing speeds and selecting the score corresponding to an optimum recording order at an optimum recording speed for the data.

10. A computer method for recording data from a source to an optical disc as recited in claim 9, wherein the selecting of the score corresponding to an optimum recording order at an optimum recording speed for the data includes verification of sufficient system cache for the selected optimum recording order at the optimum recording speed.

11. A computer method for recording data from a source to an optical disc as recited in claim 9, wherein the evaluating of the amount of system cache needed and a projected recording time for each of the plurality of orders for the list of files at each of the plurality of writing speeds includes creating a matrix of the assigned scores.

12. A computer method for recording data from a source to an optical disc as recited in claim 8, wherein the evaluating the amount of system cache needed includes calculating a theoretical transfer rate for each file in the list of files to be recorded and determining for each file in the list of files to be recorded if the file will be transferred to system cache during the recording of the data.

13. A computer method for recording data from a source to an optical disc as recited in claim 12, wherein the determining for each file in the list of files to be recorded if the file will be transferred to system cache during the recording of the data includes the maintaining of a predetermined minimum percentage of capacity of data in a buffer of the optical media recording device.

14. A computer method for recording data from a source to an optical disc as recited in claim 8, wherein the evaluating of the amount of system cache needed and a projected recording time for each of the plurality of orders for the list of files at each of the plurality of writing speeds is performed for each of the plurality of recording orders at the fastest writing speed supported by the optical media recording device first followed by evaluating each of the plurality of recording orders at each next writing speed supported by the optical media recording device, wherein each next writing speed is a successively next slower supported writing speed until the writing speed equals 1X.

15. A method for optimizing the recording order of data files selected to be recorded to optical media, comprising:

(a) obtaining a first sequence of data files selected to be recorded to the optical media;

(b) setting a first write speed for recording to the optical media;

(c) evaluating the first sequence of data files at the first write speed;

(d) setting a second write speed for recording to the optical media;

(e) evaluating the first sequence of data files at the second write speed;

(f) obtaining a second sequence of data files and repeating (b)–(e) using the obtained second sequence in place of the obtained first sequence; and (g) selecting one of the first or second sequences of data files for recording at one of the first or second write speeds, the selected sequence and write speed configured to match a sequence of data files with a write speed so as to minimize cache utilization and recording time.

16. A method for optimizing the recording order of data files to optical media as recited in claim 15, further comprising:

setting a next write speed for recording to the optical media and evaluating the first and second sequences of data files for recording at the next write speed; and obtaining a next sequence of the data files and evaluating the next sequence of data files at each of the first write speed, the second write speed, and the next write speed, wherein the setting of the next write speed is repeated for all write speeds supported by an optical media recording device, and wherein the obtaining of the next sequence of the data files is repeated for all sequences for the data files selected to be recorded to the optical media.

17. A method for optimizing the recording order of data files to optical media as recited in claim 16, wherein the evaluating of the first sequence, the second sequence, and each next sequence for the data files at each of the first write speed, the second write speed, and each next write speed includes assigning a score corresponding to each sequence at each write speed.

18. A method for optimizing the recording order of data files to optical media as recited in claim 15, wherein the evaluating of the first sequence, the second sequence, and each next sequence for the data files includes evaluating a volume of system cache required and a projected recording time for each write speed supported by the optical media recording device.

19. A method for optimizing the recording order of data files to optical media as recited in claim 18, wherein the evaluating the volume of system cache required includes calculating a theoretical transfer rate for each of the data files selected to be recorded to optical media and determining which files will be transferred to system cache during the recording of the data files.

20. A method for optimizing the recording order of data files to optical media as recited in claim 19, wherein the evaluating the volume of system cache required includes maintaining a predetermined minimum percentage of capacity of data in a buffer of the optical media recording device.

* * * * *